May 16, 1967 H. S. SMITH 3,320,339

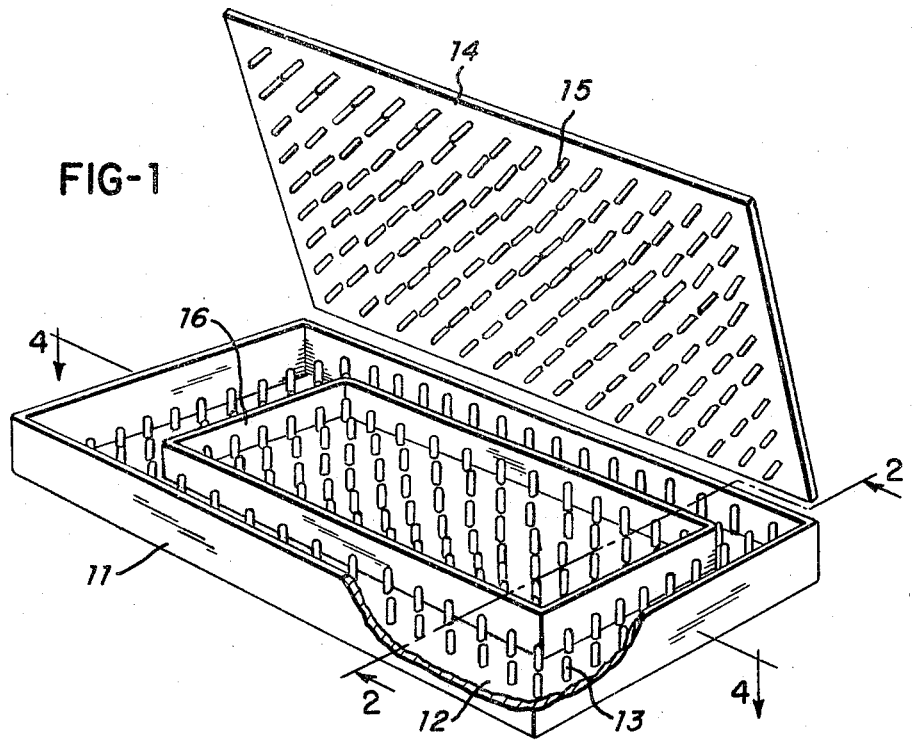
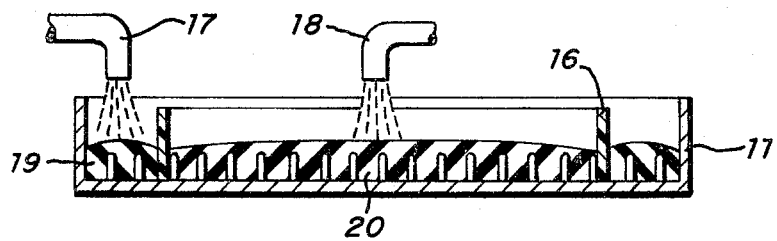
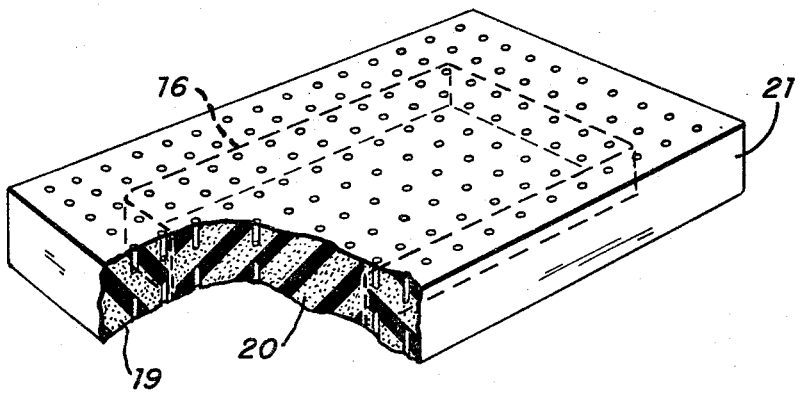

METHOD OF MANUFACTURING FOAM RUBBER ARTICLES

Filed Oct. 23, 1963 2 Sheets-Sheet 2

INVENTOR.
HOWARD S. SMITH
BY
Reuben Wolk
ATTORNEY

United States Patent Office 3,320,339
Patented May 16, 1967

3,320,339
METHOD OF MANUFACTURING FOAM
RUBBER ARTICLES
Howard S. Smith, Asheville, N.C., assignor to Dayco Corporation, Dayton, Ohio, a corporation of Ohio
Filed Oct. 23, 1963, Ser. No. 318,365
12 Claims. (Cl. 264—46)

This invention relates to a method of manufacturing unitary foam rubber articles, and more particularly to such articles as mattresses, pillows, furniture cushions, automobile seat cushions, and the like.

Articles of this nature are normally manufactured by the use of metal molds having upper and lower mold members, the lower member having a cavity in which the mold is partially filled with a liquid rubber latex composition that is foamable; that is, has been compounded to permit foaming. The foamed material is subsequently coagulated and vulcanized as more fully described in United States Patent No. 2,432,353, one of the series of patents which describes the so-called Talalay process. The mold cavity and upper mold member contain a number of core pins which project into the pin cavity so that the resultant product has a number of corings extending inwardly from both surfaces.

At the present time the above-described process utilizes a latex composition which is uniform so that the resultant product is uniform in density throughout. In many instances, however, it has been found desirable to provide a product which has dissimilar densities in various portions thereof. While such a process and product have been known in the past, it has only been accomplished by fabricating two dissimilar members and cementing them together as described, for example, in United States Patent No. 2,612,158. Such a method of fabrication has proved unsatisfactory, however, because of the extra time, expense and labor involved.

It is, therefore, a primary object of this invention to provide a method for the manufacture of cushioning members which are unitary, yet contain material of dissimilar density in various portions thereof.

It is a further object to provide a method for manufacturing such products by inexpensive methods.

In the practice of this invention the conventional Talalay process, as described in the aforesaid Patent No. 2,432,353, may be employed. However, applicant has conceieved the idea of locating an impervious dissolvable strip of material within the mold cavity to form a barrier strip. This permits two or more latices of dissimilar densities to be introduced into the various portions of the cavity which are defined by this strip. Because of the foamable nature of this material, the individual latices will foam within the respective portions of the mold cavity and will maintain their separate identities during the process. During the vulcanization the separate identity of the resulting foamed segments will also be maintained while the vulcanizing temperature will cause the barrier strip to dissolve and disappear. The mating edges of the foam segments will then merge to form a unitary product. The invention will be more fully described in the following description and accompanying drawings, in which:

FIGURE 1 is a perspective view of a typical mold illustrating a barrier strip in position.

FIGURE 2 is a sectional view taken along lines 2—2 of FIGURE 1.

FIGURE 3 is a perspective view of a finished product manufactured in accordance with the present invention.

Figure 4:
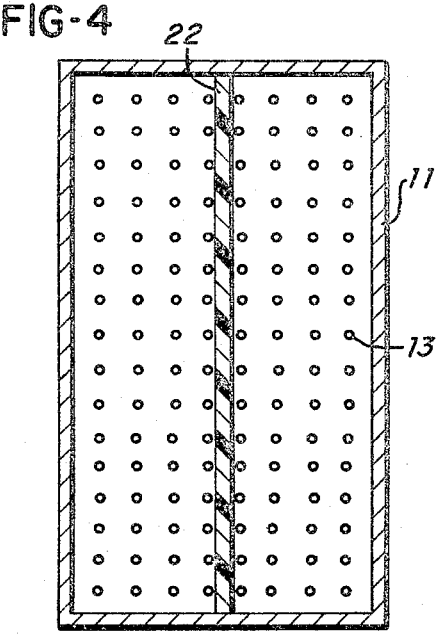
FIGURE 4 is a sectional view illustrating a modified form of the invention, the section being taken along lines 4—4 of FIGURE 1.

Referring now to the drawings, FIGURE 1 illustrates a mold consisting of lower and upper mold members. The lower mold member 11 has a mold cavity 12 in which are mounted a plurality of core pins 13. The upper mold member 14 also has core pins 15 mounted therein and is adapted to be closed on the mold member 11 in order to provide a completely enclosed mold during the process of fabrication. A barrier strip 16 is mounted in the mold cavity by placing it between adjacent pins as illustrated. As shown in FIGURE 1 this strip is parallel to the outer peripheral portion of the mold cavity and thus defines an outer peripheral portion of the cavity which is separate from the remaining portion thereof. This strip is placed on the bottom of the mold cavity, as illustrated in FIGURE 2, and the upper edge therefore is somewhat short of the top edge of the lower mold half. The barrier strip is made of an impervious low molecular polymeric material which is compatible with rubber, such as polyvinyl acetate, low molecular weight polyethylene, low molecular weight polystyrene, and similar materials falling within this category.

When it is desired to fabricate the finished product, nozzles 17 and 18 are used to introduce liquid rubber latex into the various portions of the mold. As is shown in FIGURE 2, the nozzle 17 provides a latex 19 of one density, preferably about 0.35 gram per cubic centimeter which provides a comparatively firm foam member. The nozzle 18 introduces the latex 20 into the central or remaining portion of the mold cavity; this latex has a density of approximately 0.2 gram per cubic centimeter and would provide a comparatively soft foam material. The latices are separated by the barrier strip 16, the top of the mold 14 is closed, and the subsequent process as described in the aforesaid Patent No. 2,432,353 will take place. The latices will foam to form the typical stereo-reticulate structure while maintaining their distinct identities. As further processing continues, the foaming is completed, and the finished product is subsequently vulcanized. The heat of vulcanization, which is roughly 300° F., is sufficient to dissolve the barrier strip and at the same time permit the mating edges of the foam bodies 19 and 20 to merge in order to form a unitary product. The resultant member 21, as illustrated in FIGURE 3, will consist of a molded foam rubber article having its peripheral edge 19 comparatively firm and the remaining main portion 20 comparatively soft. Such a product has a high degree of utility because the firm edge tends to maintin the original shape of the article, and in the case of a mattress would reduce any tendency of the sleeper to roll off.

A modified form of the invention is illustrated in FIGURE 4 in which the same mold member 11 is provided with a barrier strip 22 extending along the longitudinal center line of the mold cavity instead of in the peripheral configuration shown in FIGURE 1. This strip 22 is made of the same material as the strip 16. A different latex is introduced into each half of the mold cavity as defined by the strip; as the foaming process takes place in the manner previously described, a product results in which each half has a different density, one of which is firmer than the other. Preferable densities of the two halves are about 0.9 gram per cubic centimeter and 0.06 gram per cubic centimeter. In the final product the barrier strip 22 is also dissolved and the two halves of the finished article will merge and create a unitary member in a similar manner to that described above. A finished product manufactured in this manner will have utility in a mattress, for example, because it provides soft and firm halves in accordance with the preferences of the users.

Figure 5:
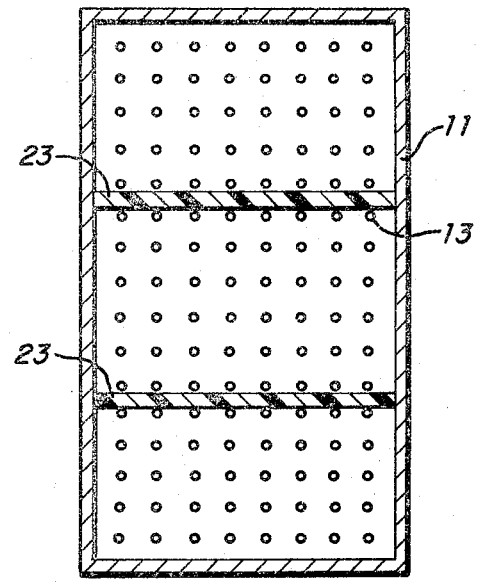
FIGURES 5 and 6 are views similar to FIGURE 4 illustrating further modifications of the invention.

A further form of the invention is illustrated in FIGURE 5 in which the mold half 11 has a pair of barrier strips 23 located transversely of the mold cavity dividing it into approximately three equal portions. The strips 23 are made of the same material as described with reference to strip 16. The processing will take place exactly as described above in which the latex having a firmer density will be introduced into the central portion of the mold cavity as defined by the strips 23, while the latex of softer density will be introduced into the end portions. During vulcanization the barrier strip 23 will again be dissolved and the components of the finished article will merge at their edges to form a unitary product. By means of this process, a finished article, such as a mattress, is provided in which the central area is firmer in order to accommodate the maximum weight concentration of the sleeper, thus minimizing any tendency for the mattress to sag. The density of this section is also about 0.09 gram per cubic centimeter, while the softer end segments are approximately 0.06 gram per cubic centimeter.

Figure 6:
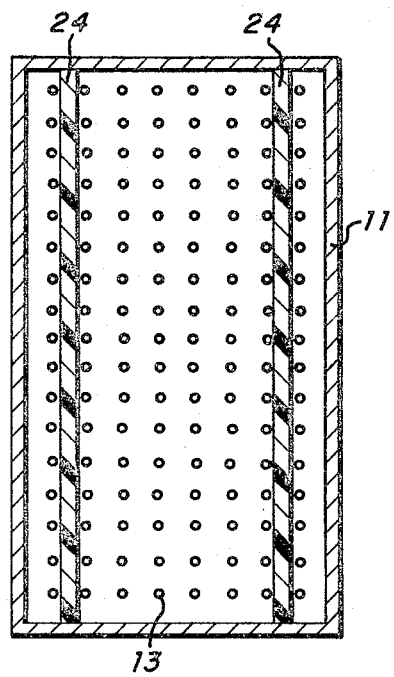

FIGURE 6 illustrates still another form of the invention in which barrier strips 24, identical in composition to the strips 16, are placed within the mold cavity in a longitudinal direction to define two longitudinal edge portions and a main central portion. The latex providing a firmer foam product is introduced into the edge portions, while a dissimilar latex is introduced into the central portion. During the subsequent processing, the strips 24 will dissolve and the edges of the foam material will merge to form a unitary member. The finished product will be one in which the edges are firmer than the central portion, and thus in the case of a mattress will again prevent the tendency of the edges to be rounded or will prevent the sleeper from rolling off.

Although certain forms of the invention have been described, it should be noted that other modifications are possible which still fall within the scope of the invention. The basic principle of this invention, however, is one in which dissolvable barrier strips are located in the mold to create distinct segments of a foamed material which merge at their mating edges to create a unitary member, while at the same time the barrier strip dissolves during the process.

What is claimed is:

1. The method of manufacturing molded unitary foam rubber articles in a mold cavity having core pins mounted therein, comprising the steps of placing an impervious strip within said mold cavity to separate said cavity into different portions, introducing foamable rubber latex into one portion of said cavity, introducing foamable rubber latex of a different density into the remaining portion of said cavity, maintaining separate identity of said latices by means of said strip during foaming and eliminating said strip while vulcanizing said latices into a unitary member.

2. The method of claim 1 in which said strip is made of a low molecular weight polymeric material compatible with rubber.

3. The method of claim 2 in which said material is polyvinyl acetate.

4. The method of claim 2 in which said material is polyethylene.

5. The method of claim 2 in which said material is polystyrene.

6. The method of claim 1 including the steps of maintaining said strip in place by placing it between adjacent pins.

7. The method of claim 1 including the steps of placing said strip along the longitudinal center line of said mold cavity, and introducing one of said latices into each portion of said cavity defined by said strip.

8. The method of claim 1 including the steps of placing said strip parallel to the periphery of said mold cavity, introducing one of said latices into the outer peripheral portion of said mold cavity defined by said strip, and introducing the other of said latices into the remaining portion of said mold cavity.

9. The method of claim 8 in which the latex in said peripheral portion has a greater density than the latex in the remaining portion.

10. The method of claim 1 including the steps of placing a plurality of said strips transversely of said mold cavity to define central and end portions therein, introducing one of said latices into said central portions, and introducing the other of said latices into said end portions.

11. The method of claim 10 in which the latex in said central portion has a greater density than the latex in said end portions.

12. The method of claim 1 including the step of placing at least one of said strips longitudinally of said mold cavity to define at least two longitudinal portions therein.

References Cited by the Examiner

UNITED STATES PATENTS

| | | | |
|---|---|---|---|
| 2,150,287 | 3/1939 | Minor | 264—46 |
| 2,180,304 | 11/1939 | Minor | 264—46 XR |
| 2,632,922 | 3/1953 | Kish. | |
| 2,685,607 | 8/1954 | Blood. | |
| 2,974,079 | 3/1961 | Korotkeich. | |
| 3,020,587 | 2/1962 | Alderfer et al. | 264—46 |
| 3,081,488 | 3/1963 | Casavina et al. | |
| 3,161,436 | 12/1964 | Hood | 264—46 XR |

ALEXANDER H. BRODMERKEL, *Primary Examiner.*

P. E. ANDERSON, *Assistant Examiner.*